United States Patent
Berkon

(10) Patent No.: US 12,332,735 B2
(45) Date of Patent: Jun. 17, 2025

(54) ESTIMATING ORIGINAL CAUSE OF SYSTEM REBOOT

(71) Applicant: Arista Networks, Inc., Santa Clara, CA (US)

(72) Inventor: Finbar McManus Berkon, Sydney (AU)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/363,570

(22) Filed: Aug. 1, 2023

(65) Prior Publication Data
US 2025/0045145 A1 Feb. 6, 2025

(51) Int. Cl.
*G06F 11/00* (2006.01)
*G06F 11/07* (2006.01)
*G06F 11/30* (2006.01)

(52) U.S. Cl.
CPC ........ *G06F 11/079* (2013.01); *G06F 11/3055* (2013.01)

(58) Field of Classification Search
CPC ............................ G06F 11/079; G06F 11/3055
See application file for complete search history.

(56) References Cited

U.S. PATENT DOCUMENTS

| | | | | |
|---|---|---|---|---|
| 6,745,343 B1 * | 6/2004 | Barenys | ............... | G06F 11/327 714/36 |
| 7,017,085 B2 * | 3/2006 | Braun | ................. | G06F 11/0787 714/24 |
| 8,335,913 B2 * | 12/2012 | Mendelow | .......... | G06F 11/1441 714/24 |
| 9,870,282 B2 * | 1/2018 | Swierk | ............... | G06F 9/45533 |
| 10,924,347 B1 * | 2/2021 | Narsian | ................... | H04L 47/12 |
| 11,204,822 B1 * | 12/2021 | Iljazi | ....................... | H04L 9/14 |
| 2015/0286515 A1 * | 10/2015 | Monk | .................... | G06Q 10/10 714/57 |
| 2017/0371758 A1 * | 12/2017 | Cherkalova | ......... | G06F 11/3055 |
| 2023/0273852 A1 * | 8/2023 | Anand | ................ | G06F 11/3006 714/15 |

* cited by examiner

*Primary Examiner* — Jonathan D Gibson
(74) *Attorney, Agent, or Firm* — Sprinkle IP Law Group

(57) ABSTRACT

Methods and systems for determining reload causes for computing devices are disclosed. Embodiments may employ a reload model of a computing device to determine a reload cause for the computing device, where that reload model may specify a hierarchy of the monitoring components of the computing device. Reload indicators may be determined in association with the monitoring components of the network device using this reload model. A reload cause for the computing device can be determined by evaluating these reload indicators.

19 Claims, 3 Drawing Sheets

ESTIMATING ORIGINAL CAUSE OF SYSTEM REBOOT

BACKGROUND

Computing devices reload for a variety of causes. Such reloads may be planned, or may be caused by a number of unplanned circumstances. These reloads, especially those that are unplanned, may have significant adverse impact. This is especially true when the computing device is a network device such as a switch or router used to provide the network infrastructure for implementing a network environment. A lack of data about such reloads may, however, severely affect any attempt to determine or address any problems that cause such reloads.

Accordingly, a network device may offer the ability to provide a "reload cause" to a user. As such the network device may determine the reload cause and present this reload cause in response to a request from the user. The determination of this reload cause may be based on reload indicators provided by the hardware of the network device. The determination of these reload causes is, however, quite difficult.

What is desired, then, is to more simply and accurately determine a reload cause of a reload of a network device in a manner that can be applied across network devices with differing architectures and hardware components.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
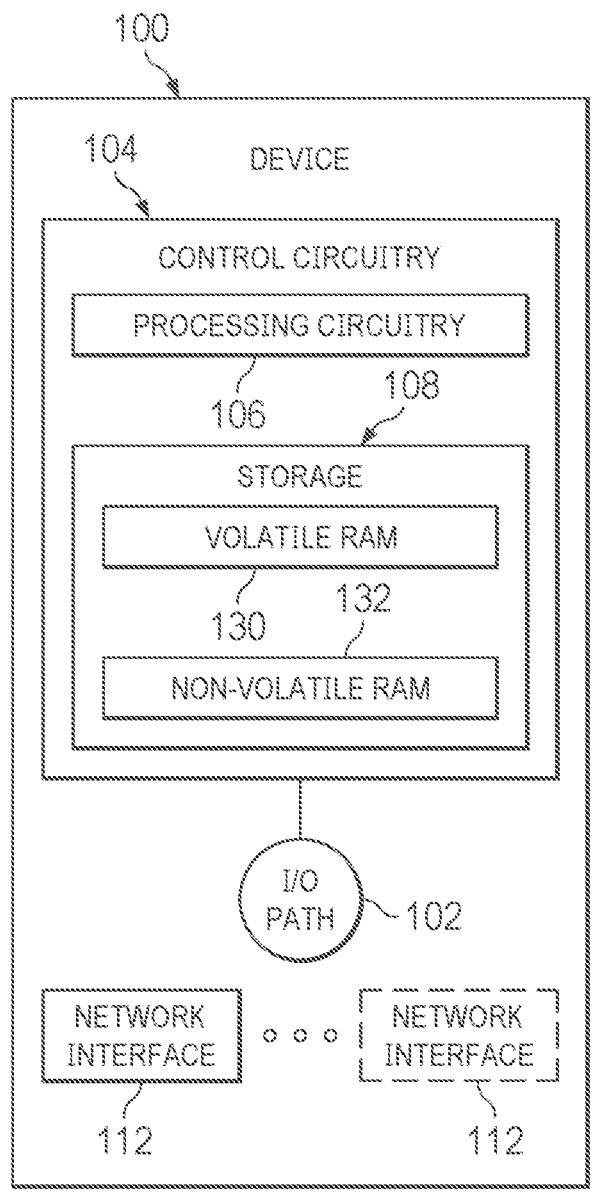
FIG. 1 is a block diagram depicting a general architecture of an embodiment of a network device for determining a reload cause.

As discussed, computing devices reload (e.g., shutdown or crash and reboot or reinitialize, etc.) for a variety of causes. Such reloads may be planned, as when a user initiates a reload through the operating system or the like. Reloads may also be caused by a number of unplanned circumstances: an operating system kernel can panic, power may be interrupted or otherwise removed from the computing device or particular components of the device, the combination of the configuration of the device along with operating conditions may cause a reload (e.g., the computing device may be configured to shut down when a certain number of fans fail), etc. Many of these causes may cause the crash or shutdown of a computing device without the knowledge or involvement of the software (e.g., operating system) on that computing device.

These reloads, especially those that are unplanned, may have significant adverse impact. This is especially true when the computing device is a network device such as a switch or router used to provide the network infrastructure for implementing a network environment. A lack of data about such reloads may, however, severely affect any attempt to determine or address any problems that cause such reloads.

Accordingly, a network device may offer the ability to provide a "reload cause" to a user. In particular, the network device may determine the reload cause and present this reload cause in response to a request from the user. The determination of this reload cause may be based on reload indicators provided by the hardware of the network device.

To illustrate in more detail, the hardware of the network device may include one or more hardware components, where each of the hardware components may include one or more integrated circuits (e.g., Application Specific Integrated Circuits (ASICs) or microprocessors). For example, these hardware components may be individual ASICs such as switching ASICs, CPUs, etc., or may be cards or boards including multiple other hardware components, such as multiple individual ASICs, etc.

These hardware components may be monitored by monitoring components, where these monitoring components may themselves include one or more circuits or ASICs, such as a Field Programming Gate Array (FPGA) or a Digital Power Manager (DPM). This monitoring hardware may record fault information on faults that occurred on the hardware component being monitored when such a fault occurs. This fault information recorded by the monitoring components may thus be used to provide a reload cause to a user of the network device.

The determination of these reload causes is, however, quite difficult. What is often desired is to determine a reload cause that is the "root" cause of the reload (e.g., the fault or cause that initiated the reload, or initiated or is the first action in a chain of events that resulted in the reload). While fault information may be determined from each of these monitoring components, the determination of such a root cause may be difficult. In particular, because these monitoring components may utilize different clocks, any timing (e.g., timestamp) information associated with that fault information may not be reliable. While synchronization of these clocks may be accomplished, oftentimes the tolerance of such synchronization relative to the timing involved with the reload and faults in the hardware components may not be of sufficient granularity or resolution to allow the accurate determination of a first, or root, fault from such fault information. Other difficulties also present themselves with respect to the determination of such reload causes. Namely, certain techniques for determining reload causes were heavily dependent on the architecture, or type, of the underlying hardware and monitoring components and, in certain cases, are not flexible enough to accommodate different types of architectures or hardware.

What is desired, then, is to determine a reload cause of a reload of a network device that allows a determination of a root cause of such a reload in a manner that may utilize data other than timing information, and that can more easily be applied across network devices with differing architectures and hardware components.

To those ends, among others, attention is now directed to embodiments of the methods and systems for determining a reload cause presented herein. These embodiments may employ a reload model of a network device to determine a reload cause for the network device, where that reload model may specify a hierarchy of the monitoring components of the network device. This hierarchy of the monitoring components may model the manner in which a cause of a reload may propagate through the hardware components of the network device. In particular, the hierarchy of the monitoring components in the reload model may specify, for certain monitoring components, an alternative source that is another (e.g., different) monitoring component of the network device. The specification of an alternative source may designate, for example, another monitoring component that may propagate a cause to the monitoring component for which it is specified as an alternative source. This alternative source for a monitoring component may thus be cause specific in certain embodiments. For example, for a particular monitoring component in the hierarchy there may be different alternative sources specified in association with different causes. Certain monitoring components in the hierarchy may be indicated as their own sources (or may not have an associated alternative source such that if no alternative source is specified it can be determined that the monitoring component itself may be a source of a cause of a reload).

Accordingly, reload indicators may be determined in association with the monitoring components of the network device. These reload indicators may include a cause and a source monitoring component. The cause can be determined based on the underlying hardware component being monitored. Specifically, when a fault occurs in an underlying hardware component, a monitoring component may write to a non-volatile storage location with fault information corresponding to a fault that occurred. This fault information may thus be used to determine (or as) the cause of a reload indicator.

A source monitoring component to include in the reload indicator may be determined by reference to the reload model. Specifically, the monitoring component used in the generation of the cause can be referenced in the hierarchy of monitoring components of the reload model to determine if there is an alternative source associated with that monitoring component. When such an alternative source is specified for the monitoring component used to generate the cause for the reload indicator, this other monitoring component may be included as the source monitoring component of the reload indicator being generated. If there is no alternative source specified in the reload model for the monitoring component, or the monitoring component is specified as its own source (e.g., the monitoring component is associated with itself as the source monitoring component in the reload model), the monitoring component itself may be included as the source monitoring component for the source indicated in the reload indicator being generated.

In one embodiment, such reload indicators may be generated by a set of monitoring agents associated with (e.g., corresponding) monitoring components. Here, each agent may be adapted to generate a reload indicator based on an associated monitoring component (e.g., based on the fault information written in the storage location at the associated monitoring component). The monitoring agent can thus determine the cause for a generated reload indicator using the fault information stored at the associated monitoring component. The monitoring agent can also access the reload model to determine if there is an alternative source for the associated monitoring component. When there is an alternative source, this other monitoring component specified as the alternative source may be included as the source monitoring component of the reload indicator being generated. When there is no alternative source (or the same monitoring component is specified as the source), the associated monitoring component may itself be included as the source monitoring component in the reload indicator being generated.

A reload cause can thus be determined by evaluating the reload indicators associated with each of the monitoring components. Specifically, the reload indicators may be evaluated to determine a first one of the reload indicators (e.g., a first found reload indicator, such as a first reload indicator based on a reload model) where the source monitoring component specified in that reload indicator is the same as the monitoring component associated with that reload indicator (e.g., where the reload indicator was generated based on the same monitoring component specified as the source in that reload indicator). The cause specified in that first reload indicator can then be identified as the reload cause (or used to generate a reload cause).

In one embodiment, the reload model may also indicate a primary monitoring component such that the evaluation of reload indicators may begin with a reload indicator associated with that primary monitoring component. In particular, if there is no reload indicator associated with that primary monitoring component present, the reload cause may be determined to be unknown. Otherwise, the reload indicators may be iterated through in an order determined according to the source monitoring component specified in each reload indicator processed until a first reload indicator is found where the source monitoring component specified in that reload indicator is the same as the monitoring component associated with that reload indicator. The cause specified in that first reload indicator can then be identified as the reload cause.

Embodiments may also make use of software reload indicators that may be determined by software executing on the network device, including for example, the operating system of the network device itself. As noted above, in many cases a planned reload (e.g., shutdown and reboot) may be initiated by a user, or by the operating system or other software of the network device, based on an event at the network device. When such a planned or orderly shutdown occurs the software (e.g., the operating system) may write a software reload indicator specifying a cause before the system shuts down or otherwise reloads. If such a software reload indicator is present when determining a reload cause, the cause specified by the software reload indicator can be identified as the reload cause. In some cases, the presence of such a software reload indicator may be checked before any reload indicators associated with the monitoring components are processed to determine a reload cause, thus obviating the need to perform such processing in the case where a software reload indicator is present when determining a reload cause.

Turning first to FIG. 1 then, a block diagram depicting a general architecture of a network device for estimating an original reload cause of a reboot in accordance with certain embodiments is presented. Network device 100 may be a router, switch, server, or any other computing device that may be configured to control or process network traffic. The network device 100 may receive data, including packets from hosts (not shown), via an input/output (I/O) path 102. I/O path 102 may provide packet data to control circuitry 104, which includes processing circuitry 106 and storage (i.e., memory) 108. Control circuitry 104 may send and receive commands, requests, and other suitable data using I/O path 102. I/O path 102 may connect control circuitry 104 (and specifically processing circuitry 106) to one or more network interfaces 112 to which other devices of a network (e.g., hosts) can be connected. These network interfaces 112 may be any type of network interface, such as an RJ45 ethernet port, a coaxial port, etc.

Control circuitry 104 includes processing circuitry 106 and storage 108. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 106 is distributed across multiple separate processors or processing units, for example, multiple of the same type of processing units or multiple different processors. The circuitry described herein may execute instructions included in software running on one or more general purpose or specialized processors.

Processing circuitry 106 may include one or more monitoring components for monitoring one or more associated hardware components of processing circuitry. These monitoring components may themselves include one or more circuits or ASICs, such as a FPGA or DPM. These monitoring components may record fault information on faults that occurred on the hardware component being monitored when such a fault occurs. For example, when a fault occurs in an underlying hardware component, a monitoring component may write to a non-volatile storage location with fault information corresponding to a fault that occurred.

Storage 108 may be an electronic storage device that includes volatile random-access memory (RAM) 130, which does not retain its contents when power is turned off, and non-volatile RAM 132, which does retain its contents when power is turned off. As referred to herein, the phrase "electronic storage device" or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same.

Network device 100 may be configured with a reload model that models that manner in which a reload cause may propagate through the (e.g., monitored) hardware components of that network device 100. This reload model may be stored in storage 108 and may be based on, or comprise, a model encoded in a Field Replaceable Unit (FRU) Description Language (FDL). This FDL model may be compiled, where the output of the compilation of the FDL file is a reload model stored in storage 108 that is a representation of the monitoring components, and an associated hierarchy of the monitoring components defined by sources of faults for those monitoring components. This hierarchy may be defined, at least in part, by the specification of an alternative source for one or more monitoring components specified in the reload model, where that alternative source is another (e.g., different) monitoring component of the network device 100.

Control circuitry 104 executes instructions for determining reload indicators from an associated set of monitored hardware components in processing circuitry 106 and storing such reload indicators in storage 108. A reload indicator may be based on an associated monitoring component (e.g., based on the fault information written in the storage location at the associated monitoring component). A reload indicator can thus include a cause determined based on the fault information stored at the associated monitoring component. The reload model in storage 108 can also be used to determine if there is an alternative source for the associated monitoring component. When there is an alternative source, this other monitoring component specified as the alternative source in the reload model in storage 108 may be included as a source monitoring component of the reload indicator. When there is no alternative source (or the same monitoring component is specified as the source), the associated monitoring component may itself be included as the source monitoring component in the reload indicator being generated.

Control circuitry 104 may thus execute instructions for determining a reload cause from reload indicators stored in storage 108. Specifically, the reload indicators stored in storage 108 may be evaluated (e.g., according to the hierarchy specified in the reload model in storage 108) to determine a reload indicator where the source monitoring component specified in that reload indicator is the same as the monitoring component associated with that reload indicator (e.g., where the reload indicator was generated based on the same monitoring component specified as the source in that reload indicator). This reload indicator may be the first reload encountered when evaluating the set of reload indicators stored in storage 108 according to the hierarchy of monitoring components as defined by the reload model in storage 108. The cause specified in that reload indicator can then be identified as the reload cause (or used to generate a reload cause). This reload cause can be provided to a user (e.g., in response to a user request) through an interface such as a command line interface (CLI) or the like provided by the network device 100.

Figure 2:
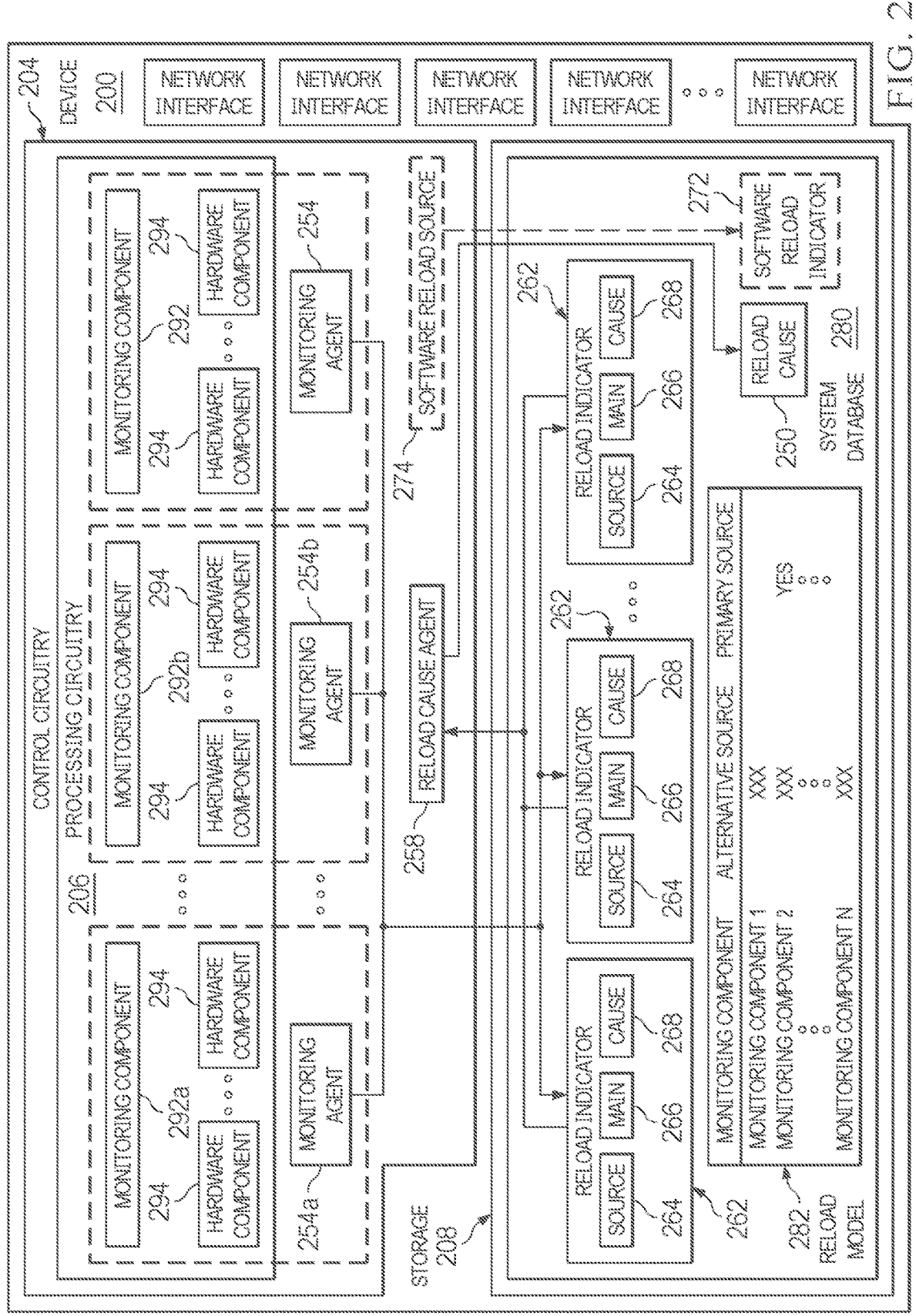
FIG. 2 is a more specific block diagram of an embodiment of a network system for determining a reload cause.

FIG. 2 is a more detailed depiction of an embodiment of a network device 200 adapted to estimate an original reload cause of a reboot. Network device includes processing circuitry 206 comprising hardware components 294. These hardware components 294 may comprise any components directly or indirectly involved in providing the hardware functionality of the network device 200 including one or more microprocessors, microcontrollers, digital signal processors, programmable logic devices, field-programmable gate arrays (FPGAs), application-specific integrated circuits (ASICs), fans, power distribution units, backplanes, etc.

Processing circuitry 206 (of control circuitry 204) may thus also include one more monitoring components 292, each monitoring component 292 adapted to monitor one or more corresponding hardware components 294 of the network device 200. These monitoring components 292 may themselves include one or more circuits or ASICs, such as a FPGA or DPM. Each monitoring component 292 may record fault information on faults that occurred on the corresponding hardware components 294 being monitored by that monitoring component 292 when such a fault occurs. For example, when a fault occurs in an underlying hardware component 294, a monitoring component 292 may write to a non-volatile storage location on that monitoring component 292 with fault information corresponding to a fault that occurred.

Monitoring agents 254 may determine reload indicators 262 from one or more associated hardware components 292 and storing such reload indicators in storage 208 (e.g., a system database 280 in storage 208). Reload cause agent 258 may be adapted to utilize such reload indicators 262 to determine a reload cause 250 and store this determined reload cause 250 in storage 208. Monitoring agents 254 and reload cause agent 258 may be implemented in hardware, software, or any suitable combination of hardware and software (e.g., in control circuitry 204). For example, monitoring agents 254 and reload cause agents 258 may be software programs stored on storage 208 (e.g., non-volatile RAM) and executed by processing circuitry 206.

In particular, monitoring agent 254 may be adapted for specific types of monitoring components 292. Thus, for example, monitoring component 292 may be a UCD90120 chip by Texas Instruments and a first monitoring agent 254 may be adapted to evaluate fault information stored by such a UCD90120 chip to generate a reload indicator from such a fault information. As another example, monitoring component 292 may be an ADM1266 Super Sequencer® chip by Analog Devices. Thus, a second monitoring agent 292 may be adapted to evaluate fault information stored by such an ADM1266 chip to generate a reload indicator from such fault information. Other examples of monitoring components 292 and associated monitoring agents 254 may also be utilized and are fully contemplated herein without loss of generality.

It will also be noted then, that monitoring agent 254 may be adapted to generate a single reload indicator 262 from a plurality of associated monitoring components 292. Moreover, there may be multiple instances of monitoring component 292 of a particular type (e.g., the same type of chip), where each instance of that monitoring component 292 may be adapted to monitor a different set of underlying hardware components 294. In such instances there may likewise be multiple instances of a monitoring agents 254 of a particular type corresponding to that type of monitoring component 292, where each instance of that monitoring agent 254 of that type may be adapted to generate a reload indicator 262 from a corresponding one of the monitoring components 292 of that type. For example, monitoring components 292a and 292b may be of the same type (e.g., may both be an ADM1266 chip). Here, monitoring agents 254a and 254b may also be of the same type (e.g., a monitoring agent configured to generate a reload indicator based on fault information in an ADM1266 chip), with monitoring agent 254a adapted to generate a reload indicator 262 based on monitoring component 292a and monitoring agent 254b adapted to generate a reload indicator based on monitoring component 292b.

Accordingly, when network device 200 reloads, each monitoring agent 254 may (e.g., asynchronously) access its corresponding one or more monitoring components 292 (e.g., the storage locations where fault information is written by monitoring component 292) to generate reload indicator 262. These reload indicators 262 may be generated based on reload model 282 configured at network device 200. Reload model 282 models the manner in which a reload cause may propagate through the (e.g., monitored) hardware components 292 of network device 200. This reload model 282 may be stored in storage 208 (e.g., a system database 280 in storage 208) and may be based on, or comprise, a model encoded in FDL. This FDL model may be compiled, where the output of the compilation of the FDL file is reload model 282 stored in storage 208 that is a representation of the monitoring components, and an associated hierarchy of the monitoring components defined by sources of faults for those monitoring components. Reload model 282 may thus specify the monitoring components 292 in the network device 200, and indicate one of those monitoring components 292 as a primary monitoring component. A primary monitoring component may be designated based on the architecture of network device 200 and may indicate a primary source of reload cause. Additionally, reload model 282 may indicate an alternative source for one or more monitoring components 292 specified in the reload model 282, where that alternative source is another (e.g., different) monitoring component 292 of the network device 200.

The specification of an alternative source may designate, for example, another monitoring component 292 that may propagate a cause to the monitoring component 292 for which it is specified as an alternative source. This alternative source for monitoring component 292 may thus be cause specific in certain embodiments. For example, for a particular monitoring component in the reload model 282 there may be different alternative sources specified in association with different causes. Certain monitoring components 292 in the reload model 282 may be indicated as their own sources (or may not have an associated alternative source such that if no alternative source is specified it can be determined that the monitoring component 292 itself may be a source of a cause of a reload).

If there is no reload indicator 262 associated with the current monitoring component 292 (e.g., initially the primary monitoring component 292), the reload cause 250 may be determined to be unknown and an indicator of an unknown reload cause may be stored as reload cause 250. If, however, a reload indicator 262 associated with the current monitoring component 292 (e.g., initially the primary monitoring component 292) is present, reload cause agent 258 can determine if the source 264 of that reload indicator 262 associated with the current monitoring component 292 indicates a different monitoring component 292.

In one embodiment, monitoring agent 254 can determine cause 268 for generated reload indicator 262 using the fault information stored at the associated monitoring component 292. Monitoring agent 254 can also access reload model 282 to determine if there is an alternative source for the associated monitoring component 292 specified in the reload model 282. When there is an alternative source in the reload model 282, this other monitoring component 292 specified as the alternative source in the reload model 282 may be included as the source monitoring component 264 of the reload indicator 262 being generated. When there is no alternative source for the monitoring component 292 associated with the monitoring agent 254 (or the same monitoring component 292 is specified as the source), the associated monitoring component 292 may itself be included as the source monitoring component 264 in the reload indicator being generated. Monitoring agent 254 may also utilize reload model 282 to determine if the monitoring component 292 associated with that monitoring agent 254 is designated as the primary (or main) monitoring component 292 in reload model 282. If that monitoring component 292 is designated as the primary monitoring component in the reload model 282, the monitoring agent 254 may set the main indicator 266 in the reload indicator 262 being generated to reflect that designation.

Reload cause agent 258 may thus evaluate reload indicators 262 stored by monitoring agents 254 to determine a reload cause 250. As monitoring agents 254 may be operating asynchronously (e.g., to one another), in one embodiment, each time a new reload indicator 262 is stored by monitoring agent 254 (e.g., at a corresponding location for that monitoring agent 254), reload cause agent 258 may access the reload indicator 262 (e.g., at the location where it is stored in storage 208) and add the newly stored reload indicator 262 to a file (e.g., a flat file) including reload indicators 262 from all monitoring agents 254. The reload cause agent 258 may then delete that reload indicator 262 (e.g., from the location where it was stored by monitoring agent 254). The addition of this new reload indicator 262 may also cause reload cause agent 258 to make a determination of reload cause 250 (e.g., each time a new reload indicator 262 is stored by a monitoring agent 254 a new determination of reload cause 250 may be initiated). Accordingly, reload cause 250 may be updated asynchronously to the operation of monitoring agents 254 but may also be updated based on the storing of new reload indicators 262 by those monitoring agents 254.

Accordingly, to determine reload cause 250 reload cause agent 258 may evaluate reload indicators 262 according to the source 264 specified in those reload indicators 262 until a first reload indicator 262 is encountered where the source monitoring component 264 specified in that reload indicator 262 is the same as the monitoring component 292 associated with that reload indicator 262 (e.g., where the reload indicator 262 was generated based on the same monitoring component 292 specified as the source 264 in that reload indicator 262). The cause 268 specified in that first encountered reload indicator 262 can then be identified as the reload cause 250 (or used to generate reload cause 250).

In one embodiment, reload cause agent 258 can evaluate reload indicators 262 beginning with a reload indicator 262 associated with (e.g., stored by) a primary monitoring component 292. In particular, the reload cause agent 258 may iterate through zero or more reload indicators 262 based on a current monitoring component maintained by the reload cause agent 258. In particular, reload cause agent 258 may record the primary monitoring component 292 as an initial "current" monitoring component to begin the iteration and determine if there is a reload indicator 262 associated with that current monitoring component (e.g., initially the primary monitoring component 292). In one embodiment, the reload cause agent 258 may access the reload model 282 to determine a primary monitoring component 292 and set that primary monitoring component 292 as the current monitoring component. The reload cause agent 258 can then determine if a reload indicator 262 from that current monitoring component 292 is present (e.g., in a storage location associated with that monitoring component 292 or a flat file including reload indicators 262). Alternatively, the reload cause agent 258 may access reload indicators 262 themselves to determine if a reload indicator 262 where the main indication 266 of that reload indicator 262 is set.

If there is no reload indicator 262 associated with the current monitoring component 292 (e.g., initially the primary monitoring component 292), the reload cause 250 may be determined to be unknown and an indicator of an unknown reload cause may be stored as reload cause 250. If however, a reload indicator 262 associated with the current monitoring component 292 (e.g., initially the primary monitoring component 292) is present, reload cause agent 258 can determine if the source 264 of that reload indicator 262 associated with the current monitoring component 292 indicates a different monitoring component 292.

When the reload indicator 262 associated with the current monitoring component 292 does not indicate another source in source field 264 (e.g., the source field is blank or specifies the current monitoring component 292 itself) the cause 268 specified in that reload indicator 262 (e.g., associated with the current monitoring component 292) can then be identified as the reload cause 250 (or used to generate reload cause 250). In this manner, the reload cause 250 may be generated utilizing the first encountered reload indicator where the source monitoring component 292 identified as the source 264 in that reload indicator 262 is the same as the monitoring component 292 associated with that reload indicator 262.

If the reload indicator 262 associated with the current monitoring component 292 does indicate another source in source field 264 (e.g., the source field specifies a different monitoring component 292) the monitoring component 292 specified in the source field 264 of the reload indicator 262 may then be set as the current monitoring component 292, and the iteration may begin using the reload indicator associated with this new current monitoring component 292. In this manner, reload cause agent 258 may iterate through reload indicators using the source field 264 specified in the reload indicator (e.g., and set by each monitoring agent 254 based on reload model 282, until a reload indicator 262 is found where the source monitoring component 292 identified as the source 264 in that reload indicator 262 is the same as the monitoring component 292 associated with that reload indicator 262. The cause 268 specified in that reload indicator 262 can then be identified as the reload cause 250 (or used to generate reload cause 250). Reload cause 250 can be provided to a user (e.g., in response to a user request) through an interface provided by the network device 200.

Embodiments of network device 200 may also make use of software reload indicator 272 that may be determined by software reload indicator source 274 executing on the network device 200, including, for example, the operating system of the network device 200 itself. A planned reload (e.g., shutdown and reboot) of network device 200 may be initiated by a user, or by the operating system or other software of the network device 200, based on an event at the network device. When such a planned or orderly shutdown occurs, the software reload indicator source 274 (e.g., the operating system) may write a software reload indicator 272 specifying a cause before the system shuts down or otherwise reloads. If such a software reload indicator 272 is present when reload cause agent 258 determines reload cause 250, the cause specified by the software reload indicator 272 can be identified as the reload cause 250. In some cases, the presence of software reload indicator 272 in storage 208 may be checked by reload cause agent 250 before any reload indicators 262 associated with the monitoring components are processed to determine reload cause 250, thus obviating the need to perform such processing in the case where a software reload indicator 272 is present when determining reload cause 250.

Figure 3:
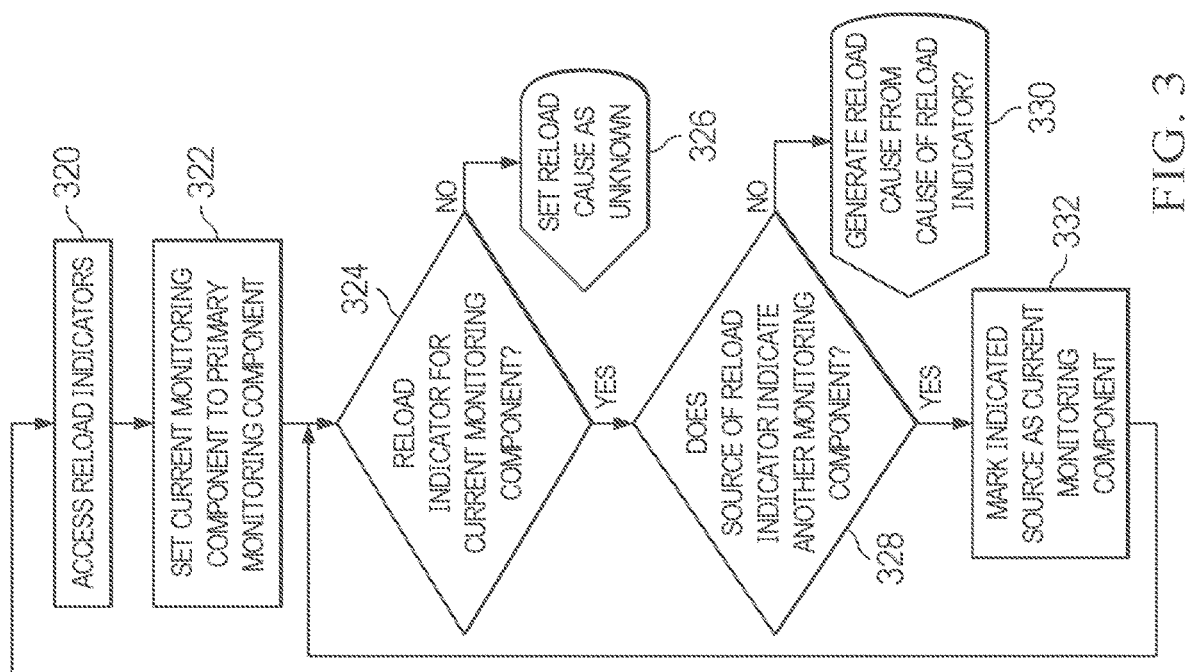
FIG. 3 is a flow diagram for one embodiment of a method for determining a reload cause at a network device.
Figure 3:
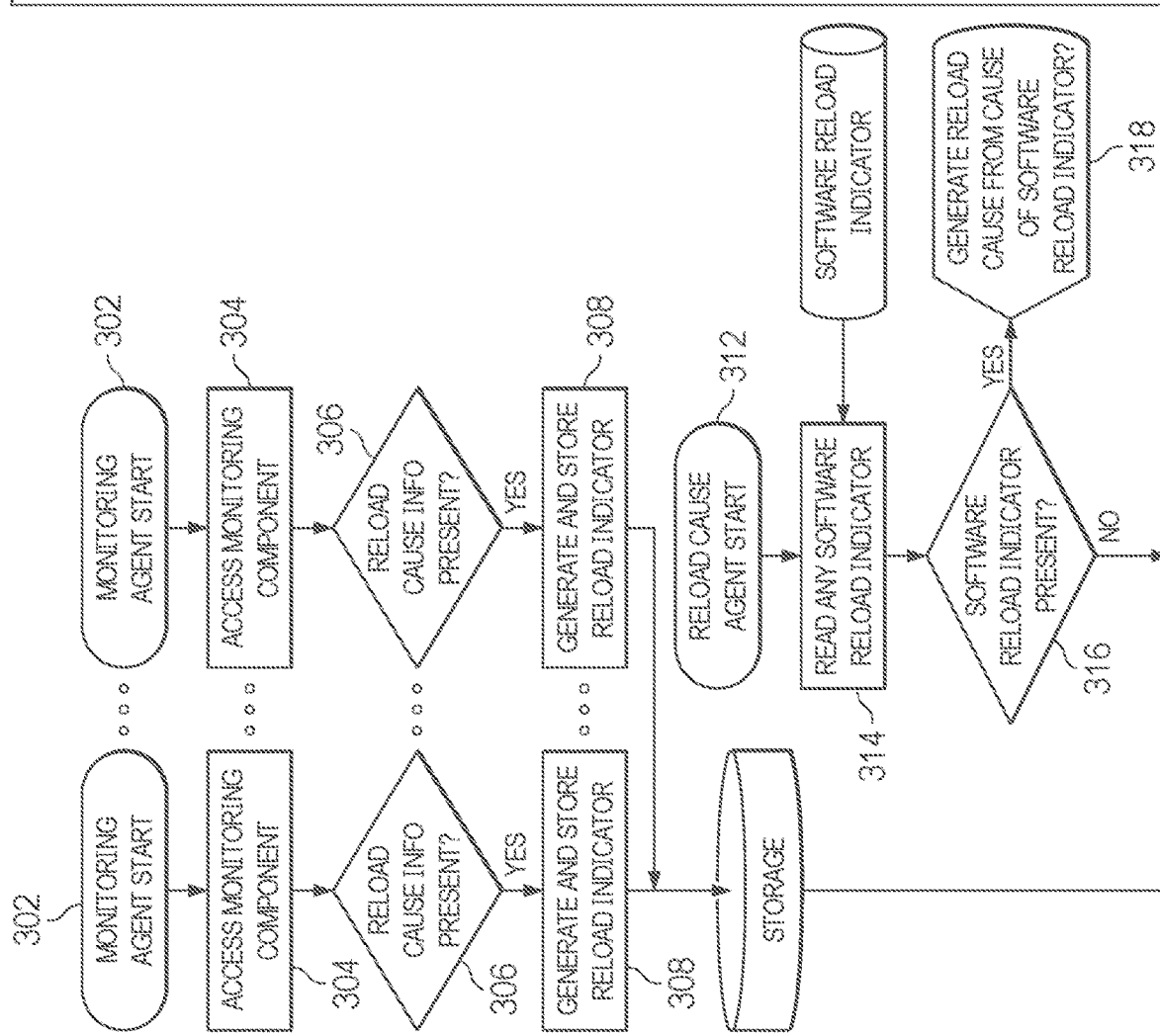

Moving now to FIG. 3, one embodiment of a method that may be utilized by a network device to determine a reload cause is depicted. When a network device reloads, or sometime thereafter, each of a set of monitoring agents may be started (STEP 302) (e.g., asynchronously). Each monitoring agent may correspond to one or more monitoring components at the network device. Thus, a monitoring agent may access its corresponding one or more monitoring components (e.g., the storage locations where fault information is written by monitoring component) to determine if reload cause information is present in the associated monitoring components (STEP 304). When such reload cause information is present in the monitoring component (or components) associated with that monitoring agent, (Y Branch of STEP 306), the monitoring agent may generate and store a reload indicator based on that monitoring component and the reload cause information (STEP 308).

As discussed, these reload indicators may be generated by a monitoring agent based on a reload model configured at the network device that models the manner in which a reload cause may propagate through the (e.g., monitored) hardware components of the network device. This reload model indicates a primary monitoring component and an alternative source for one or more monitoring components. Certain monitoring components in the reload model may be indicated as their own sources (or may not have an associated alternative source such that if no alternative source is specified it can be determined that the monitoring component itself may be a source of a cause of a reload). The monitoring agent may thus access the reload model of the network device to generate a reload indicator including a cause, a source monitoring component, and a primary indication indicating if the monitoring component associated with that reload indicator is the primary monitoring component.

When a network device reloads, or sometime thereafter, a reload cause agent may also be started (e.g., asynchronously to each of the monitoring agents at the network device) (STEP 312). When the reload cause agent is started it may attempt to read any present software reload indicators (e.g., written by software on the system before the system shut down or otherwise reloaded) (STEP 314). These software reload indicators may be accessed at specific storage locations on the system that may be written by source for such software reload indicators. If such software reload indicators are present (Y Branch of STEP 316), a reload cause may be generated based on the cause specified by the software reload indicator (STEP 318).

If, however, no software reload indicators are present (N Branch of STEP 316), the reload indicators stored by the monitoring agents at the network device may be accessed (e.g., at the location where they are stored by the monitoring agents) (STEP 320). Here, a primary monitoring component (e.g., as designated in the reload model at the network device) may be set as a current monitoring component to begin an iteration through the stored reload indicators (STEP 322). It can then be determined if there is a reload indicator associated with that current monitoring component (STEP 324).

If there is no reload indicator associated with the current monitoring component (N Branch of STEP 324) the reload cause may be determined to be unknown and an indicator of an unknown reload cause may be stored as reload cause (STEP 326). If, however, a reload indicator associated with the current monitoring component is present (Y Branch of STEP 324), it can be determined if the source specified by that reload indicator indicates a different monitoring component (STEP 328).

When the reload indicator associated with the current monitoring component does not indicate another source (No Branch of STEP 328) the cause specified in that reload indicator can then be identified as the reload cause (or used to generate reload cause) (STEP 330). If the reload indicator associated with the current monitoring component does indicate another source in source field (e.g., the source field specifies a different monitoring component) (Yes Branch of STEP 328) the monitoring component specified as the source in the reload indicator may then be set as the current monitoring component (STEP 332), and the iteration may be begin using the reload indicator associated with this new current monitoring component (STEP 324). A reload cause agent can thus iterate through reload indicators from monitoring components using the source field specified in each reload indicator (e.g., and set by each monitoring agent based on a reload model), until a first reload indicator is found where the source monitoring component identified as the source in that reload indicator is the same as the monitoring component associated with that reload indicator. The cause specified in that first found reload indicator can then be identified as a reload cause which can be provided to a user.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method for providing a reload cause for a computing device, comprising:
    following a reload of a computing device:
    determining a set of reload indicators from each of a set of monitoring components of the computing device, each of the set of reload indicators associated with a monitoring component, wherein:
        a reload indicator comprises a cause for the reload of the computing device determined based on one of a set of hardware components of the computing device being monitored by the monitoring component of the computing device, and a source monitoring component that is a source associated with that reload indicator,
        the monitoring component that is the source of the reload of the computing device is determined based on a reload model, and
        the reload model defining a hierarchy of the set of monitoring components, including an alternative source for the reload indicator associated with at least one of the monitoring components; and
    evaluating the set of reload indicators based on the hierarchy of the set of monitoring components defined by the reload model to determine a reload cause.

2. The method of claim 1, wherein evaluating the set of reload indicators is based on the source of each of the set of reload indicators.

3. The method of claim 2, wherein the hierarchy of monitoring components models a propagation of the cause through the set of hardware components of the computing device.

4. The method of claim 1, wherein the hierarchy of the set of monitoring components is defined by a designation of a primary monitoring component.

5. The method of claim 4, where the hierarchy of the set of monitoring components is defined by the alternative source associated with at least one of the monitoring components in association with the designation of the primary monitoring component.

6. The method of claim 5, wherein the alternative source is associated with the cause.

7. The method of claim 4, wherein the method further comprises determining the reload cause is unknown when the set of reload indicators does not include a reload indicator from the primary monitoring component.

8. The method of claim 1, further comprising:
determining whether a software reload indicator is present; and
using a cause associated with the software reload indicator as the reload cause when the software reload indicator is present.

9. The method of claim 1, wherein the set of reload indicators are determined by an agent corresponding to each of the set of monitoring components.

10. A network device, comprising:
a set of hardware components;
a set of monitoring components, each of the set of monitoring components adapted to monitor an associated hardware component of the set of hardware components of the network device;
a data store comprising a reload model, the reload model defining a hierarchy of the set of monitoring components, including an alternative source for the reload indicator associated with at least one of the set of monitoring components;
a non-transitory computer readable medium, comprising instructions for:
following a reload of the network device:
writing a software reload indicator based on the reload of the network device, the software reload indicator indicating a cause for the reload of the network device;
a set of monitoring agents, each monitoring agent adapted for:
determining a reload indicator from an associated monitoring component based on the reload model, wherein the reload indicator comprises a cause for the reload of the network device determined based on the associated monitored component, and a source monitoring component that is a source associated with that reload indicator; and
a reload cause agent adapted for:
determining whether a software reload indicator is present;
when the software reload indicator is present, using the cause associated with the software reload indicator as a reload cause;
when the software reload indicator is not present, evaluating the reload indicator from each of the set of monitoring agents based on the hierarchy of the set of monitoring components defined by the reload model to determine the reload cause.

11. The network device of claim 10, wherein evaluating the reload indicator from each of the set of monitoring agents to determine the reload cause comprises:
determining a first reload indicator where the source monitoring component of the reload indicator is the same as the monitoring component associated with that first reload indicator; and
using the cause of that first reload indicator as the reload cause.

12. The system of claim 10, wherein the network device comprises a software reload indicator source adapted to write the software reload indicator.

13. The network device of claim 12, wherein the software reload indicator source is an operating system executing on the network device.

14. The network device of claim 10, wherein each of the monitoring agents is specific to the associated monitoring component.

15. A method for providing a reload cause for a computing device, comprising:
following a reload of a computing device:
determining whether a software reload indicator is present at the computing device;
when the software reload indicator is present, using a first cause associated with the software reload indicator as a reload cause for the reload of the computing device;
when the software reload indicator is not present:
determining a set of reload indicators from each of a set of monitoring components of the computing device, each of the set of reload indicators associated with a monitoring component, wherein:
a reload indicator comprises a second cause for the reload of the computing device determined based on one of a set of hardware components of the computing device being monitored by the monitoring component of the computing device, and a source monitoring component that is a source associated with that reload indicator,
the source monitoring component is determined based on a reload model defining a hierarchy of the set of monitoring components, including a primary component and an alternative source for the reload indicator associated with at least one of the monitoring components; and
evaluating the set of reload indicators based on the hierarchy of the set of monitoring components defined by the reload model to determine a reload cause.

16. The method of claim 15, wherein the hierarchy of monitoring components models a propagation of the cause from a designated primary monitoring component.

17. The method of claim 16, wherein the propagation of the cause is modeled by the alternative source associated with at least one of the monitoring components.

18. The method of claim 15, wherein the reload cause is unknown.

19. The method of claim 15, wherein the alternative source is cause specific.

* * * * *